United States Patent
Cominsky

[19]

[11] Patent Number: 5,823,571
[45] Date of Patent: Oct. 20, 1998

[54] MUD FLAP RETAINING DEVICE FOR VEHICLES

[76] Inventor: James J. Cominsky, 11000 Painesville-Warren Rd., Painesville, Ohio 44077

[21] Appl. No.: 701,784

[22] Filed: Aug. 26, 1996

[51] Int. Cl.⁶ ..................................................... B62B 25/16
[52] U.S. Cl. ............................................ 280/847; 280/154
[58] Field of Search ................................. 280/847, 848, 280/851, 154

[56] References Cited

U.S. PATENT DOCUMENTS

| | | |
|---|---|---|
| 3,158,386 | 11/1964 | Tillinghast . |
| 3,219,363 | 11/1965 | Dalsey . |
| 3,224,791 | 12/1965 | Sogoian . |
| 3,285,624 | 11/1966 | Aber . |
| 3,333,868 | 8/1967 | Sogoian . |
| 3,700,260 | 10/1972 | Moore . |
| 4,323,262 | 4/1982 | Arenhold . |
| 4,695,070 | 9/1987 | Knox . |
| 4,856,816 | 8/1989 | Francis . |
| 4,923,215 | 5/1990 | Williams . |
| 5,044,667 | 9/1991 | Manning . |
| 5,460,412 | 10/1995 | Vincent et al. . |
| 5,486,079 | 1/1996 | Martin . |

*Primary Examiner*—Richard M. Camby
*Attorney, Agent, or Firm*—Joseph H. Taddeo

[57] ABSTRACT

The present invention relates to a mud flap retainer device for attachment to the transverse, rearward facing support frame of a truck. The retainer device comprises a spring biased bracket constructed as a unitary, stainless steel piece, that incorporates releasability of the mud flap without destruction thereof, if the flap is pulled under a truck tire or is torn away by similar exceptional forces.

18 Claims, 5 Drawing Sheets

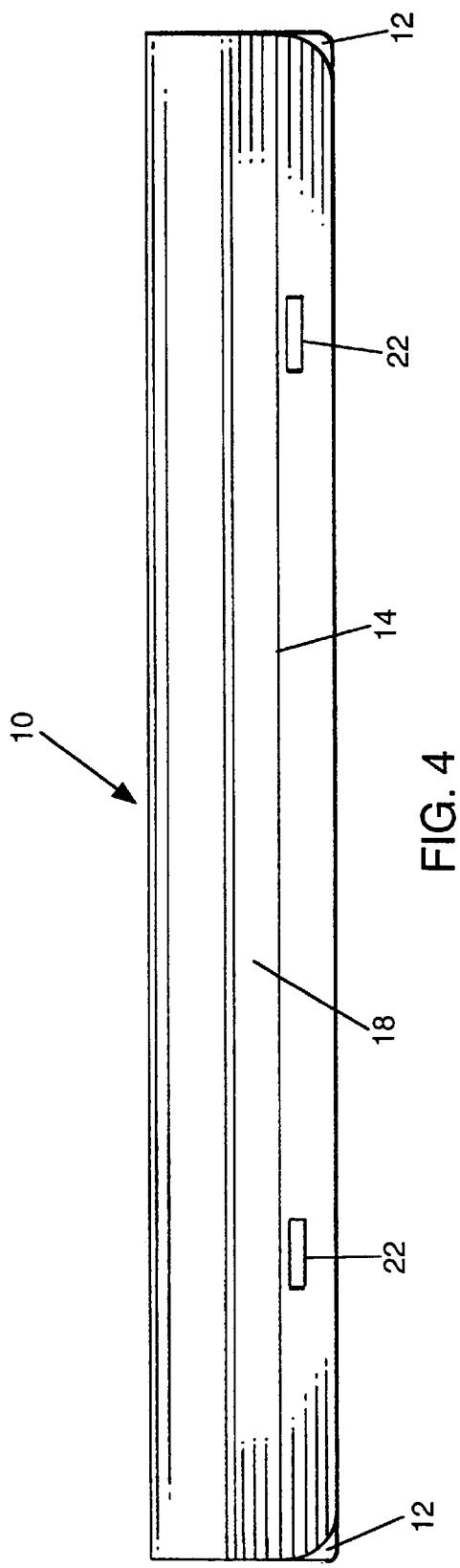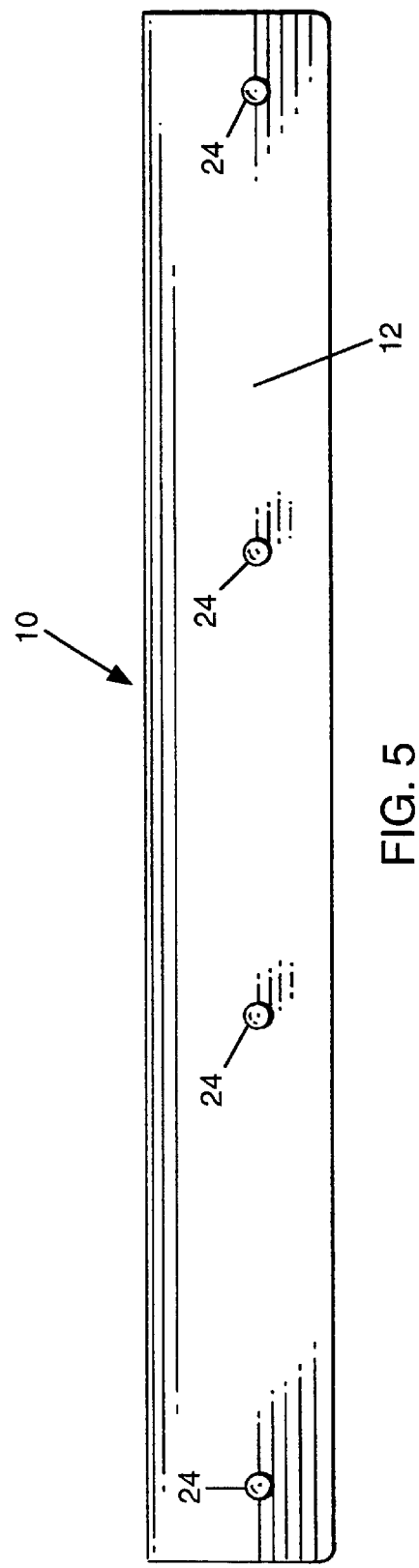

MUD FLAP RETAINING DEVICE FOR VEHICLES

FIELD OF THE INVENTION

The invention relates to a device to expedite attachment of mud flaps to trucks that prevents damage to the flaps and the retaining device itself. More particularly, the invention is a spring clamp biased for tightly gripping a mud flap adapted to facilitate installation and repositioning of the flaps.

BACKGROUND OF THE INVENTION

Prior art clamps for mud flaps have used fasteners through the flaps themselves for securement to the truck frame. When a flap is caught under truck wheels or torn away, the flap is damaged and reinstallation frequently requires cutting away the damaged portions and reforming the securement means. Consequently, the reconfigured flap may not comply with transportation standards for flap dimension and configuration.

U.S. Pat. No. 3,158,386, to Tillinghast et al., provides a specialized mud flap clamp means for use with a flap specifically formed for cooperation with the clamp.

Likewise, in U.S. Pat. No. 3,219,363, to Dalsey, et al, a mud flap is designed for use with the clamp.

Meanwhile, U.S. Pat. No. 3,778,086, to Moore, et al., describes a hinge portion urged against a base plate by spring and bolt means.

There are many disadvantages of one kind or another as shown in the prior art multi-piece mud flap clamps. Due to these and other disadvantages and limitations, their use has been restricted with only limited market approval and distribution.

These objections can be overcome by the present invention that will be disclosed in the following paragraphs. What is needed is a flap retaining device that has releasability which allows for release of the flap when forced or pulled away from the truck, without damage to the flap or its retention bracket.

SUMMARY OF THE INVENTION

The flap retainer means of the invention is formed by a single, unitary stainless steel piece, comprising a bracket with a flat portion for attachment to, and dependency from, a truck frame by standard fasteners. The flat portion is bent on itself to form a clamp having a mud flap gripping area. And the grip area of the device is bent again, outward from the grip area, to form a leverage strut having pry holes which are adapted for insertion of a screwdriver or other pry instrument. As such, the screwdriver inserts under the strut into a pry hold and an outward pressure on the screwdriver provides leverage on the strut for opening the clamp by widening the grip area for reinstallation, repositioning and retention of mud flaps within the bracket.

The flat portion includes a series of stud projections for insertion in corresponding holes in the rearward facing, transverse flap frame support of the truck. In an alternate embodiment, the grip area of the flat portion includes a series of nubs or dimples on the inside of the clamp, which project into the grip area to impinge on the flap and enhance frictional retention of the flap.

In either embodiment, the bracket is formed of stainless steel that can be heat treated into spring metal which, in the structure described herein, comprises a spring clamp with sufficient bias for retaining the flap against forces up to the shear strength of the flap itself.

It is therefore an object of the present invention to provide a mud flap retainer device that simultaneously provides the characteristics of durability, sufficient spring bias to hold the flaps against the elements and forces against which they are commonly subjected, ease of installation and repositioning of flaps, and releasability on confrontation of superior force, such as impingement of a flap under a truck tire, without destruction to the truck support frame, the flap or its retention device.

Another object is to provide a mud flap retaining device which can be constructed as a one-piece, integral element with reduced manufacturing costs.

Yet another object of the invention is to provide a mud flap retainer with a strut having pry holes to receive a screwdriver or other leverage bar, that enables replacement or repositioning of mud flaps by an operator of the vehicle without training, assistance or specialized equipment.

It is a further object of the invention that the flap which acts as a splash and spray suppressant device in combination with the spring bracket disclosed herein, can be installed, adjusted, removed and replaced without encountering fasteners which may be frozen through corrosion by rust or stripped and jammed.

Still another object that will become apparent through this disclosure, is that a mudguard may be easily aligned and clamped in a desired position relative to wheels of the vehicle for compliance with federal and state safety requirements for wheel protectors.

Other objects and features of this invention will be apparent in part and so indicated hereinafter. Further advantages will be apparent to those of ordinary skill in the art upon reading and understanding the following detailed description.

BRIEF DESCRIPTION OF THE DRAWINGS

FIG. 4 is a front orthogonal of the retaining device;

FIG. 5 is an orthogonal rear view of the device;

DETAILED DESCRIPTION OF THE PREFERRED EMBODIMENT

Figure 1:
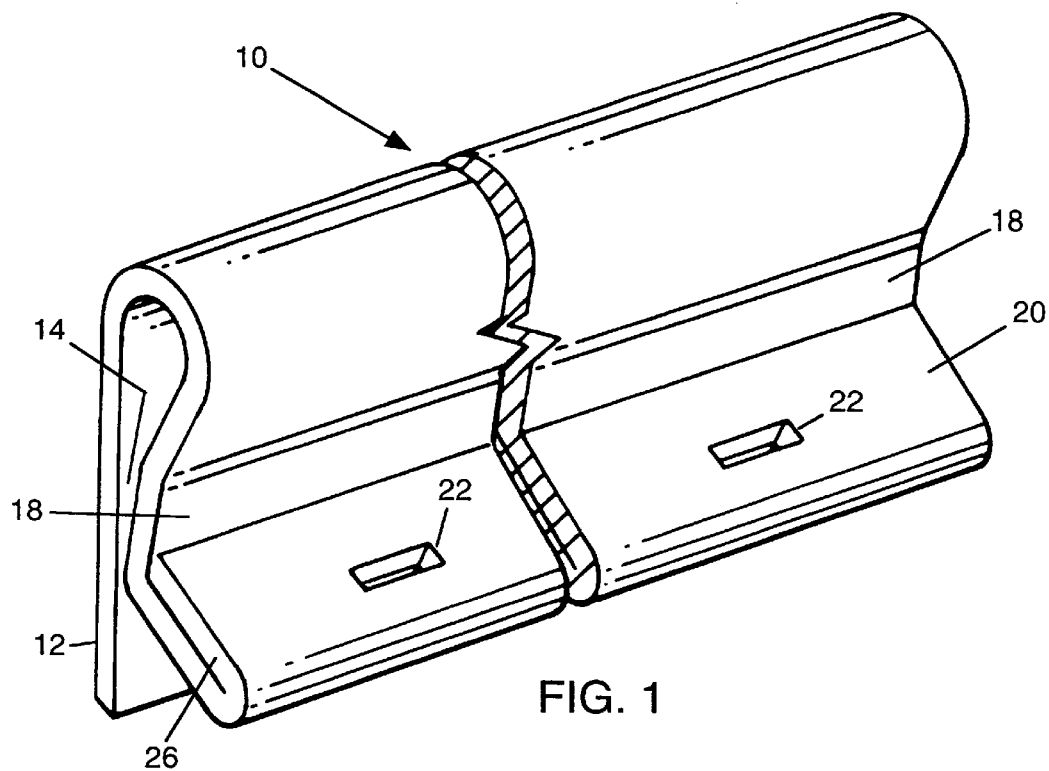
FIG. 1 is front perspective view of the mud flap retaining device of the invention.

The newly designed mud flap retaining device or spring bracket 10 shown in FIG. 1 indicates the flat portion 12 that is adapted for installation on the corresponding truck support frame (not shown). This portion 12 provides a flat clamp area 14 which may include a series of projecting nubs or dimples 16 to provide increased frictional strain on the flap 105 (in FIG. 3) retained therein.

Figure 2:
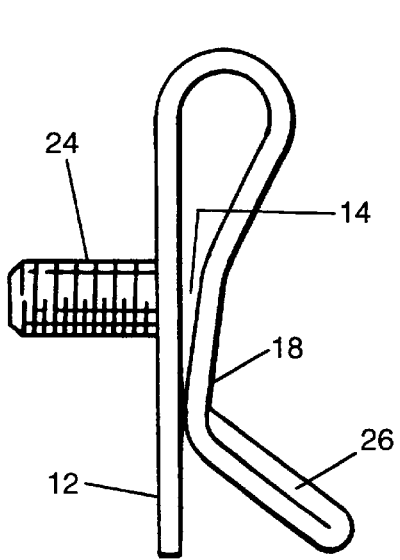
FIG. 2 is a side plan of the retaining device.

Turning to FIG. 2, a side plan of the retaining device 10, the flat portion 12 extends upwardly, whereupon it is bent on itself, and descends down to a pinch or grip area 14 of the spring bracket 10. The flat portion 12 and its opposed spring clip or clamp section 18 are separated by only several thousandths of an inch for sufficient pinch by spring bias and frictional restrain on the mud flap 105 (in FIG. 3).

Figure 3:
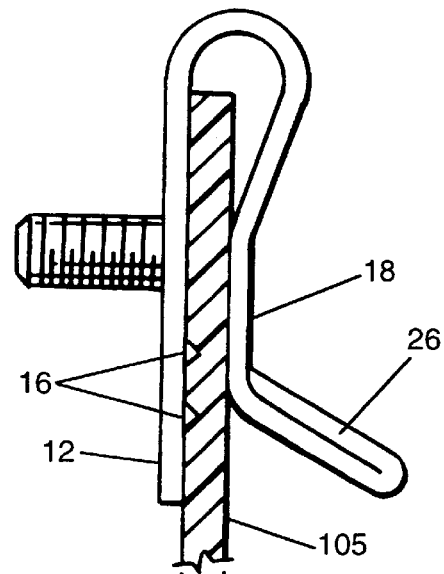
FIG. 3 is a side view of the retaining device operatively clamping a mud flap.

By reference to FIG. 3, a side view of the retaining device operatively clamping a mud flap 105, the spring force or clamp action of the retaining device 10 is designed with sufficient bias to hold the mud flap 105 within the bracket 10 against forces up to the shear strength of the flap itself Beyond the clamp area 14, the bracket 10 is bent radially outward from the flat portion 12 to form a strut 20 having pry holes 22 for application of leverage on the strut 20, by inserting a screwdriver (not shown) from under the strut 20, to counteract against the spring bias of the clamp section 18 of the bracket 10 for removal, adjustment or reinstallation of a flap 105 in a one-man operation without requiring assistance or any specialized equipment. It will be understood, by reference to FIG. 4, a front orthogonal of the retaining device, and FIG. 5, an orthogonal rear view of the device, that no bolts, washers or nuts are required for insertion and retention of a flap within the bracket of this invention. Studs 24 which project from the back of the bracket 10 are insertable into the transverse, rearward facing frame support of a truck. Hanging the bracket is an essentially permanent installation with no requirement or necessity for removal of the flap retaining device when installing, changing or adjusting the flaps. Clearly, the invention disclosed here obviates the concomitant inconvenience confronting an operator when such fastener components attendant to prior art brackets become sealed by corrosion.

It will also be apparent that the flap 105 is only releasable from the retaining device 10 on application of an exceptional force, such as when a flap 105 may accidentally be caught under a truck tire (not shown). The flaps themselves will have an extended use due to the releasability feature of my invention. Thus, the flaps, that must comply with transportation safety requirements on installation, may also be enhanced and popularized visual indicia such as company, home base or truck operator logos.

To assure sufficient strength of the strut 20 to act as a leverage bar, a strut fortification extension 26 is preferably formed as an integral component of the strut 20. The strut fortification extension 26 is an integrally extended portion of the strut 20, folded back on itself, for strengthening the strut as a leverage projection when opening the bracket.

Figure 6:
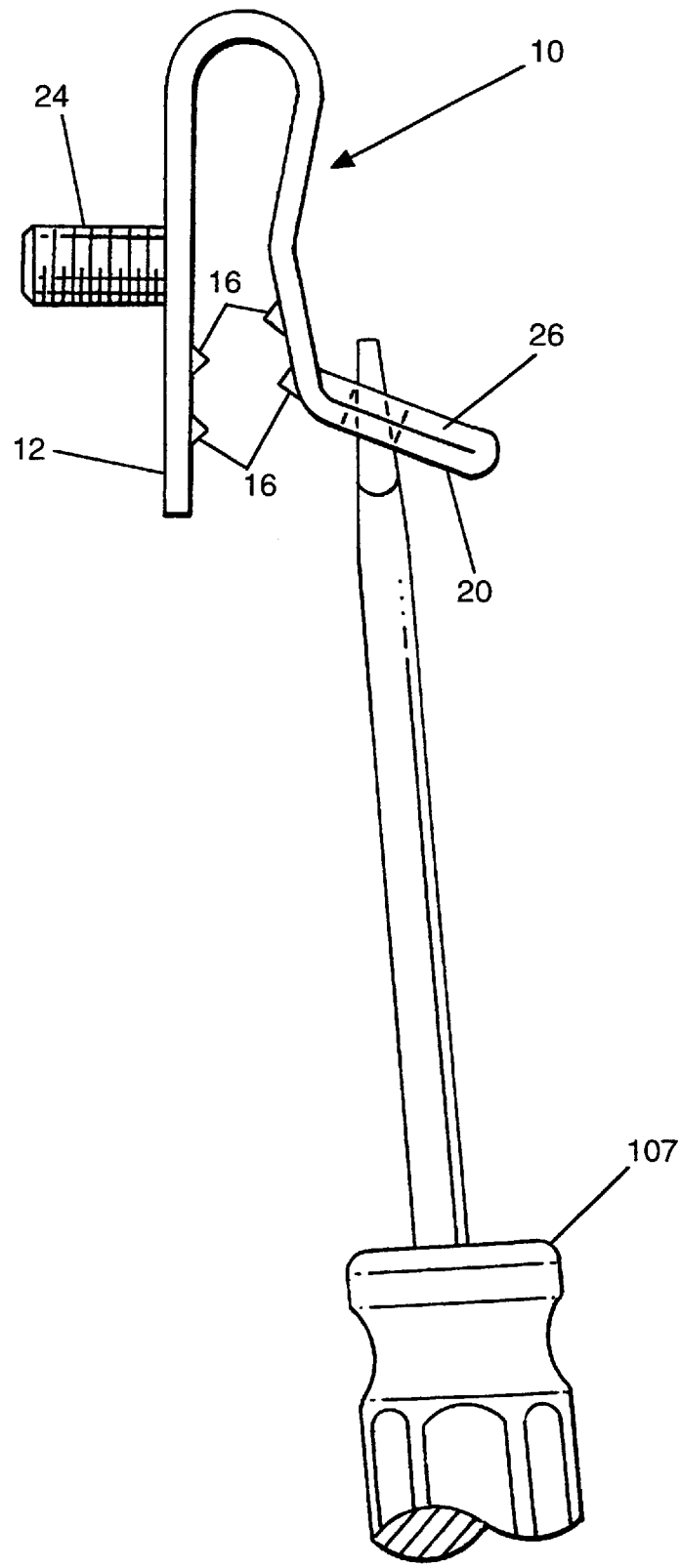
FIG. 6 indicates the spring bracket operatively pried open by leverage of a screwdriver for outward pressure on the strut.
Figure 6A:
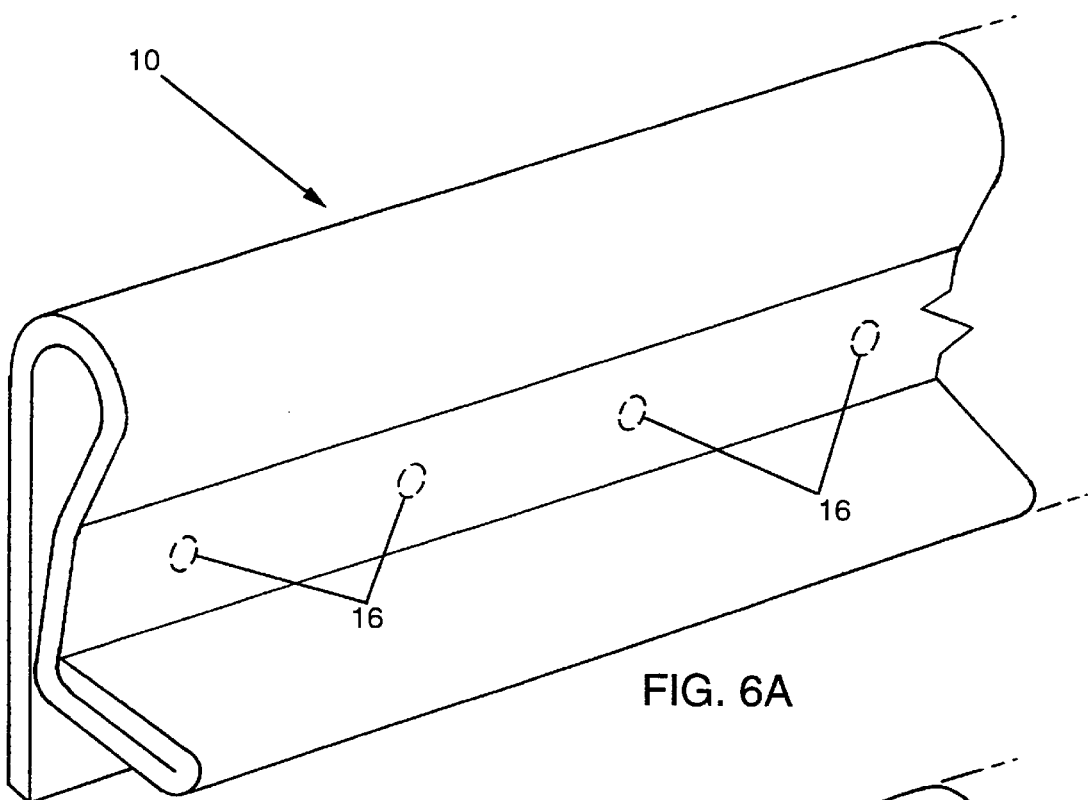
FIG. 6A is a partially cutaway view of the bracket showing nubs shaped like a mound.
Figure 7:
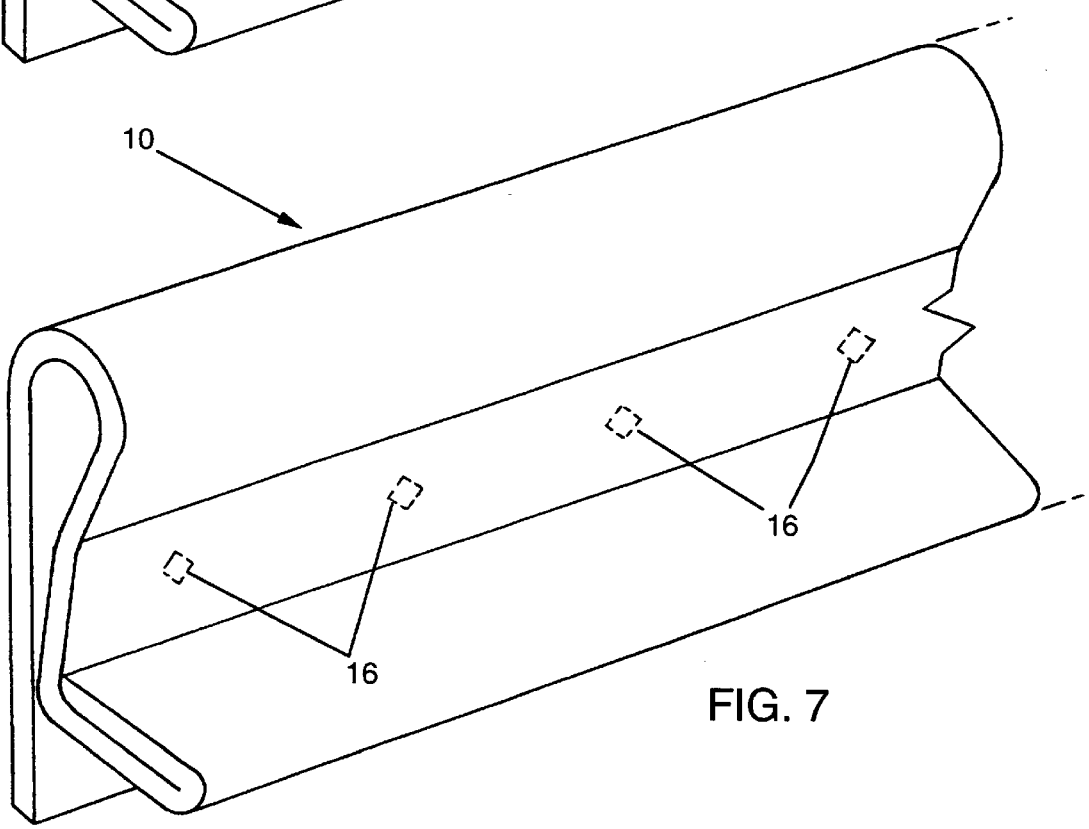
FIG. 7 is a partially cutaway view of the bracket to show the nubs in linear configuration; and, FIG. 7A is a partially cutaway view of the bracket to show the nubs in triangular configuration.
Figure 7A:
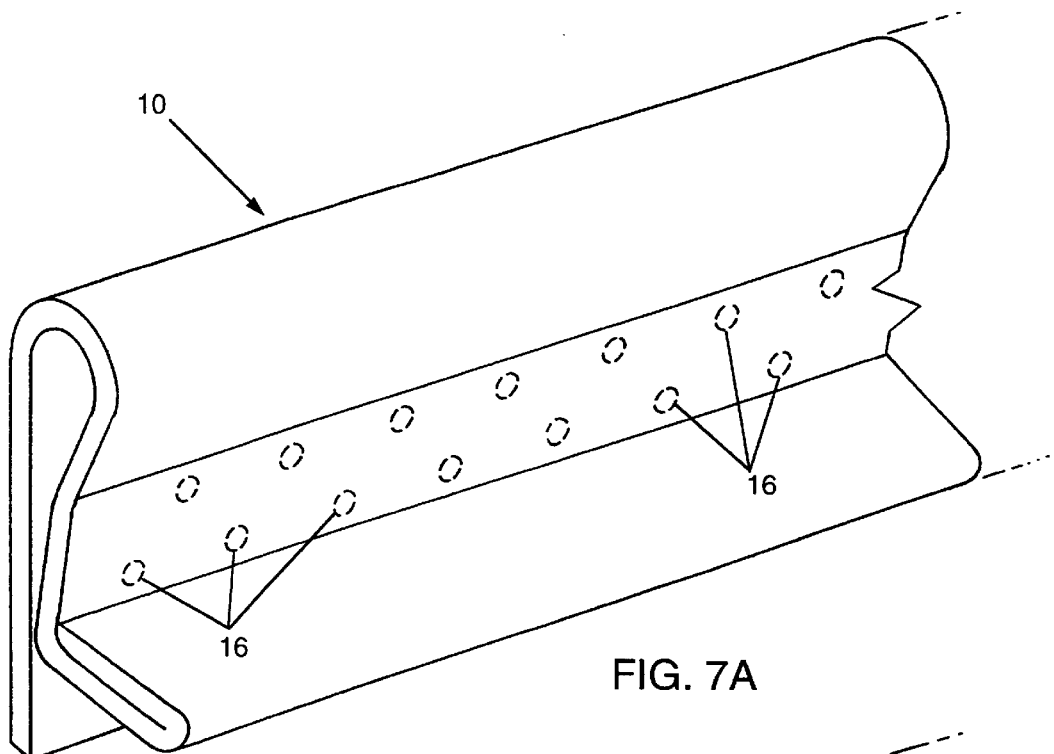
Figure 8:
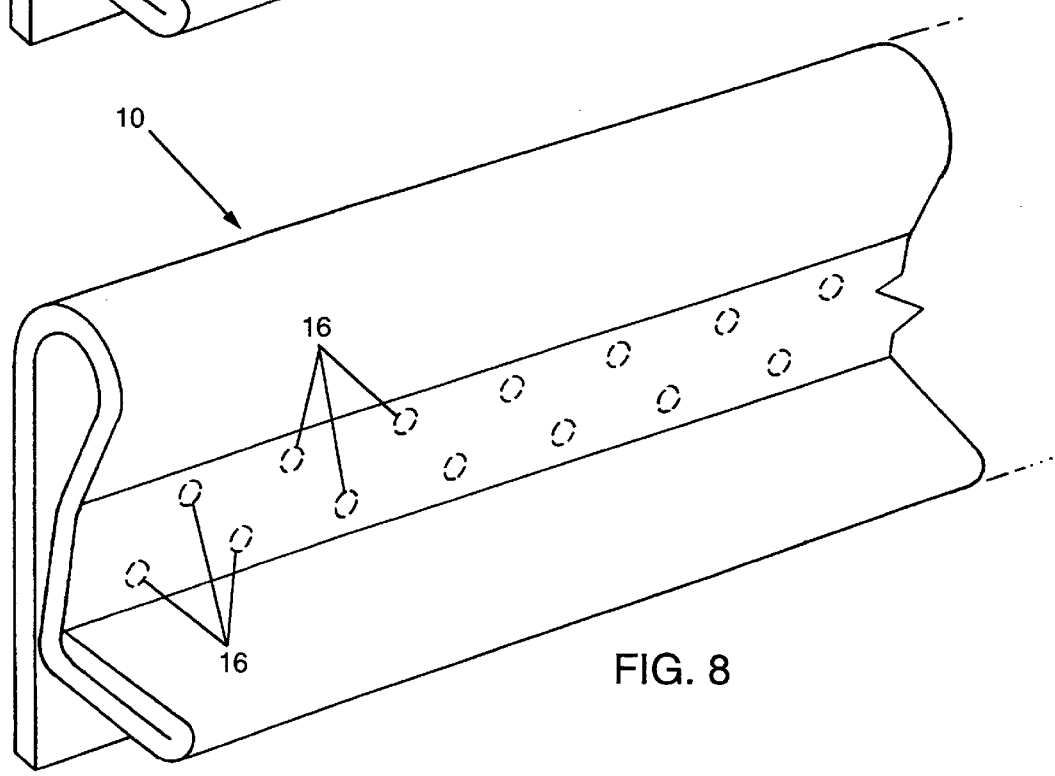
FIG. 8 is a partially cutaway view showing the mound shaped nubs in triangular configurations and positioned alternately on the flat portion and on the clamp section.

Reference to FIG. 6 indicates that in operation, the spring bracket 10 is pried open by insertion of a screw driver 107 or other pry instrument into a pry hole 22 for outward pressure on the strut 20 and consequent opening of the bracket for insertion, adjustment or removal of a flap. FIG. 6 further indicates that the projecting nubs or dimples 16 may be positioned in alternating configuration on both the flat portion 12 and on the clamp section 18. In a further refinement to enhance grip action without diminishing releasability characteristics of the bracket 10, the nubs 16 may have a pyramidal shape with an opposed interlock array as in shown in FIG. 6; or the nubs 16 may be shaped as rounded hillocks or mounds and be aligned in a linear array as in FIG. 6A. Other alternatives provide for the nubs 16 to have the pyramid shape and to be in a linear configuration as in FIG. 7; or the nubs 16 may be positioned in a triangular configurations as shown in FIG. 7A. Other alternatives provide for the nubs 16 to be either pyramid shaped or mound shaped, arrayed in triangular configurations, and positioned alternately on the flat portion and on the clamp section as shown in FIG. 8. Meanwhile, the nubs may be formed of bracket material and integrally formed with the retaining device by stamping the nubs in the pyramid or mound shapes; or alternatively, the nubs may be individual plastic or rubber pieces that are fixed by adhesives to the flat portion and clamp section.

Changes and modifications can be made by those skilled in the art without departing from the spirit of the present invention. The preceding detailed description should be considered exemplary in nature and not limited to the scope and spirit of the invention as set forth in the appended claims.

What is claimed is:

1. A mudflap retainer device for attachment to a traverse, rearward facing support frame of a truck, the device comprising:

a bracket with a flat portion mounted on a truck support frame to depend from the frame;

a means for mounting the bracket on the frame;

a spring bias clamp section formed by an arch of the flat portion bent on itself in the arch to form the spring bias clamp for clamping a mudflap against the flat portion;

the retainer clamp section extending from the spring bias clamp section of the arch to form a grip area of the bracket, the grip area attenuating a space between the flat portion and the clamp section;

a leverage strut formed by an extension of the retainer clamp section bent radially outward from the clamp section near the grip area, for opening the retainer device by applying a force on the strut; and, means for enhancing frictional strain on a mud flap, said means associated with the bracket flat portion and the spring bias clamp section, for increased grip action on a mud flap retained by the bracket.

2. The mudflap retainer device according to claim 1, the bracket further comprising:

the strut having a second portion formed by the strut bent again on itself at a point outward from the grip area to form a strut fortification extension, for assuring that the strut is of sufficient strength to serve as a leverage bar.

3. The mudflap retainer device according to claim 2, further comprising:

the strut further comprising a means for coacting with a pry tool for leverage on the strut to open the clamp and retain a mudflap without a requirement for bolts, washers and nuts.

4. The mudflap retainer device according to claim 3, wherein the bracket is constructed of a single piece of a heat treated ferrous material that forms a spring metal by heat treatment, whereby the bracket allows for release of a mudflap without damage to the flap or the bracket and a flap can be installed, adjusted, removed and replaced of mud flaps in the bracket in a one man, single operation.

5. The mudflap retainer device according to claim 4, the means for coacting with a pry tool comprising a plurality of pry holes through the strut and the strut fortification extension, the holes adapted for insertion of a pry instrument under the strut and into a pry hole to widen the grip area by an outward pressure and leverage on the instrument and consequently on the strut and the strut extension, whereby a mudflap can be installed and positioned by a vehicle operator without supplemental training, additional assistance or specialized tools.

6. The mudflap retainer device according to claim 4, further comprising a plurality of studs that project from the bracket on a rear side of the flat portion, the studs adapted for insertion into corresponding holes in the rearward facing, transverse support frame support of a truck.

7. The mudflap retainer device according to claim 6, wherein the means for enhancing frictional strain on a mud flap comprises a plurality of nubs projecting into the grip area of the clamp to impinge on a mudflap and enhance frictional retention of a flap.

8. The mudflap retainer device according to claim 7, the spring bias clamp section of the bracket further comprising a spring bias force and wherein the bias of the spring clamp section is less than the shear strength of a mudflap to be retained therein.

9. The mudflap retainer according to claim 8, wherein the mudflap retainer is constructed as a one-piece, integral element for reduced manufacturing costs; and, wherein the flat portion and opposed spring clamp section are separated by the clamp area comprising less than 0.005 of an inch for sufficient pinch and frictional restraint on a mudflap.

10. The mudflap retainer device according to claim 9, wherein the retainer is constructed essentially of stainless steel to resist oxidation; that upon heat treatment forms a living spring inherent in the bracket for releasability of mudflaps, whereby mudflaps can be replaced and aligned without encountering fasteners that may be frozen by corrosion, rust or stripping.

11. The mudflap retainer device according to claim 10, wherein the studs are journalled in the flat portion of the bracket.

12. A mudflap retainer as described in claim 11, wherein the nubs are positioned on both the flat portion and the clamp section in a linear alignment and in an alternate sequence.

13. A mudflap retainer according to claim 12, wherein the nubs are positioned on both the flat portion and the clamp section in a triangular configuration and in an alternate sequence on the flap portion and the clamp section.

14. A mudflap retainer as described in claim 12, wherein the nubs have a pyramid shape.

15. A mudflap retainer as described in claim 12, wherein the nubs are shaped like rounded mounds.

16. A mudflap retainer device as described in claim claim 14, wherein the nubs are comprised of bracket material and integrally formed with the retaining device by stamping the nubs in the pyramid shape.

17. A mudflap retainer device as described in claim claim 15, wherein the nubs are comprised of bracket material and integrally formed with the retaining device by stamping the nubs in the mound shape.

18. A mudflap retainer device as described in claim claim 12, wherein the nubs are individual pieces that are fixed by an adhesive to the flat portion and the clamp section.

* * * * *